Oct. 20, 1925.

1,558,390

E. W. NORMAN

VEHICLE BRAKE

Filed May 5, 1923     3 Sheets-Sheet 2

E. W. Norman INVENTOR

BY Victor J. Evans

WITNESS:     ATTORNEY

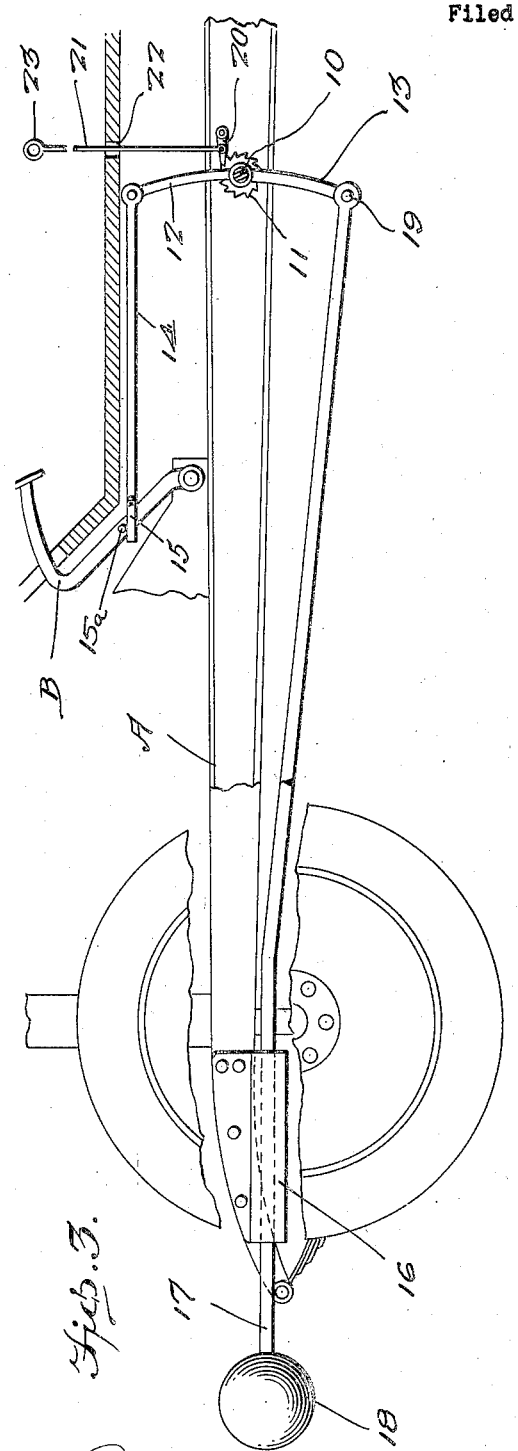
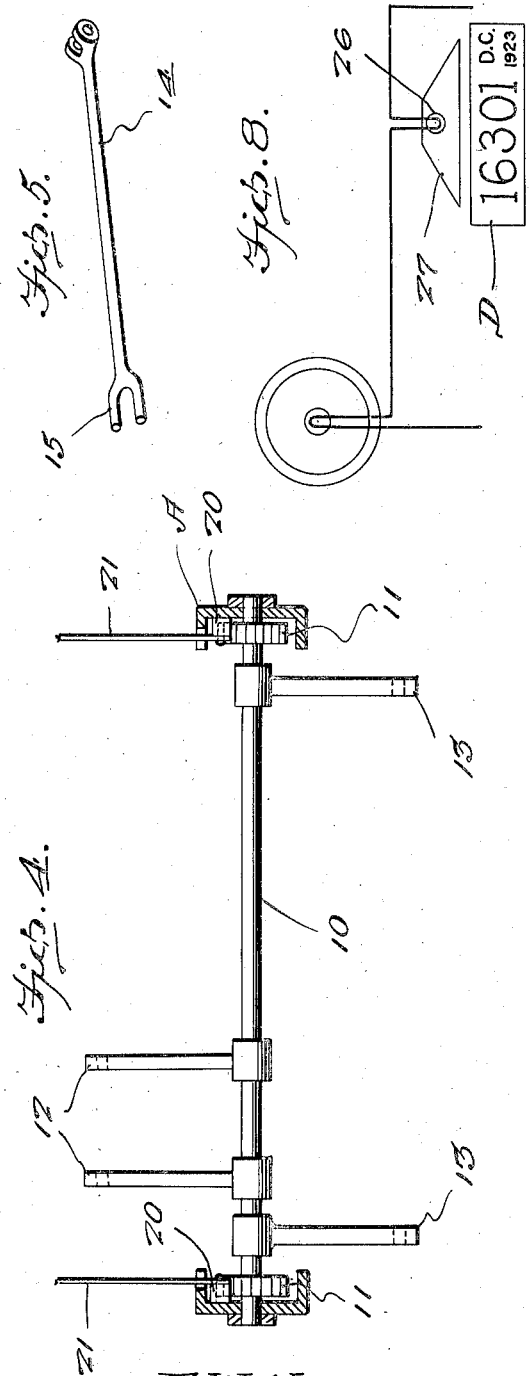

Patented Oct. 20, 1925.

1,558,390

UNITED STATES PATENT OFFICE.

ELVES W. NORMAN, OF GARY, INDIANA.

VEHICLE BRAKE.

Application filed May 5, 1923. Serial No. 636,968.

*To all whom it may concern:*

Be it known that I, ELVES W. NORMAN, a citizen of the United States, residing at Gary, in the county of Lake and State of Indiana, have invented new and useful Improvements in Vehicle Brakes, of which the following is a specification.

This invention relates to vehicle brakes and has for its object the provision of a novel device or structure constructed as an attachment to an automobile and including a movably mounted bumper equipped with means for automatically applying the brakes and throwing out the clutch when the bumper strikes an obstruction which might be another vehicle, a stationary object or a pedestrian.

An important object is the provision of an automatic brake of this character which includes movably mounted members engaging the clutch and brake pedals of the vehicle and moved upon movement of the bumper occasioned by any collision.

Another object is the provision of a device of this character in which the bumper member is so constructed as to hold the license plate and illuminating means therefor.

An additional object is the provision of a structure of this character which will be simple and inexpensive in manufacture, easy to install, positive in operation, efficient and durable in service and a general improvement in the art.

Figure 1:
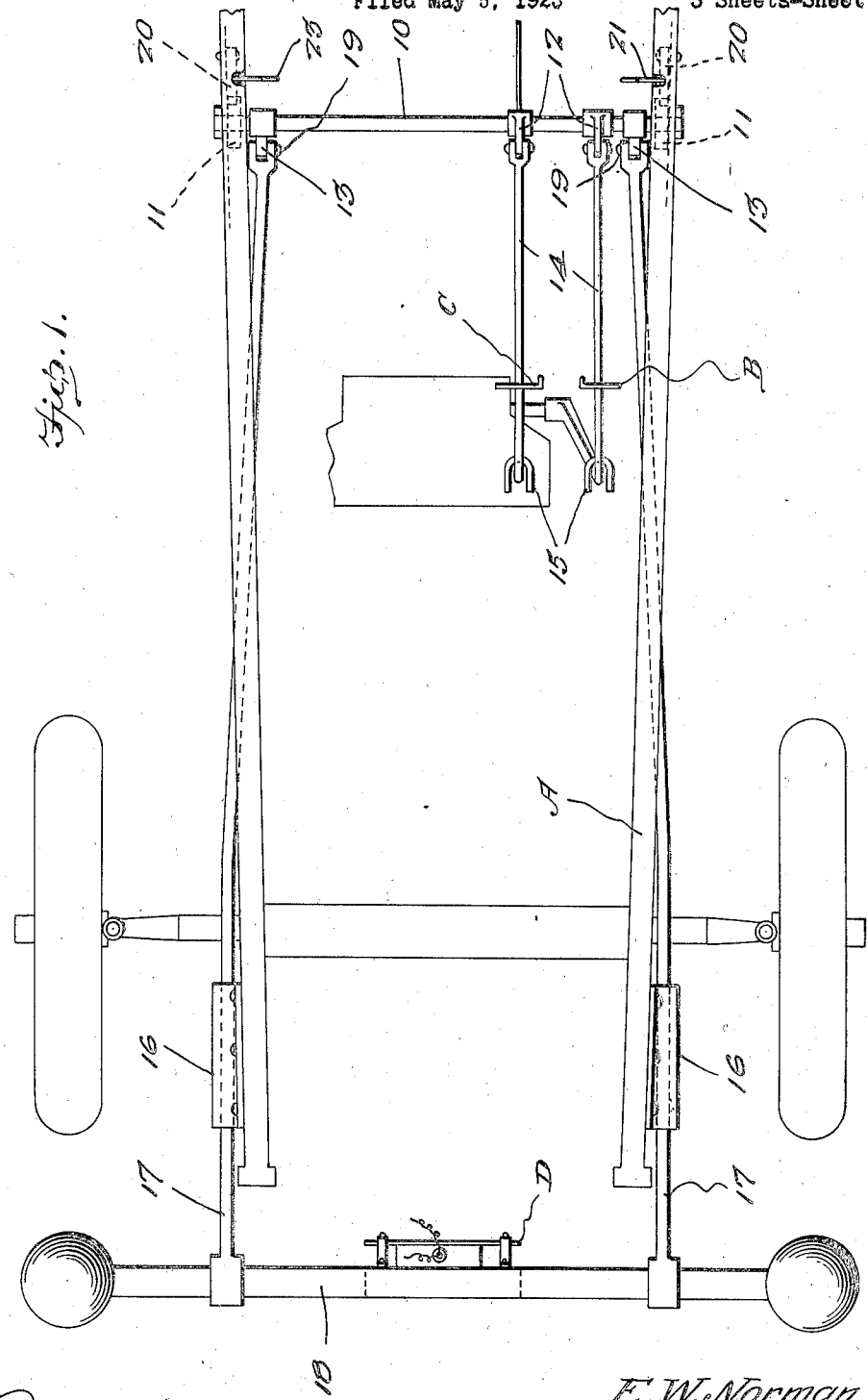
Figure 2:
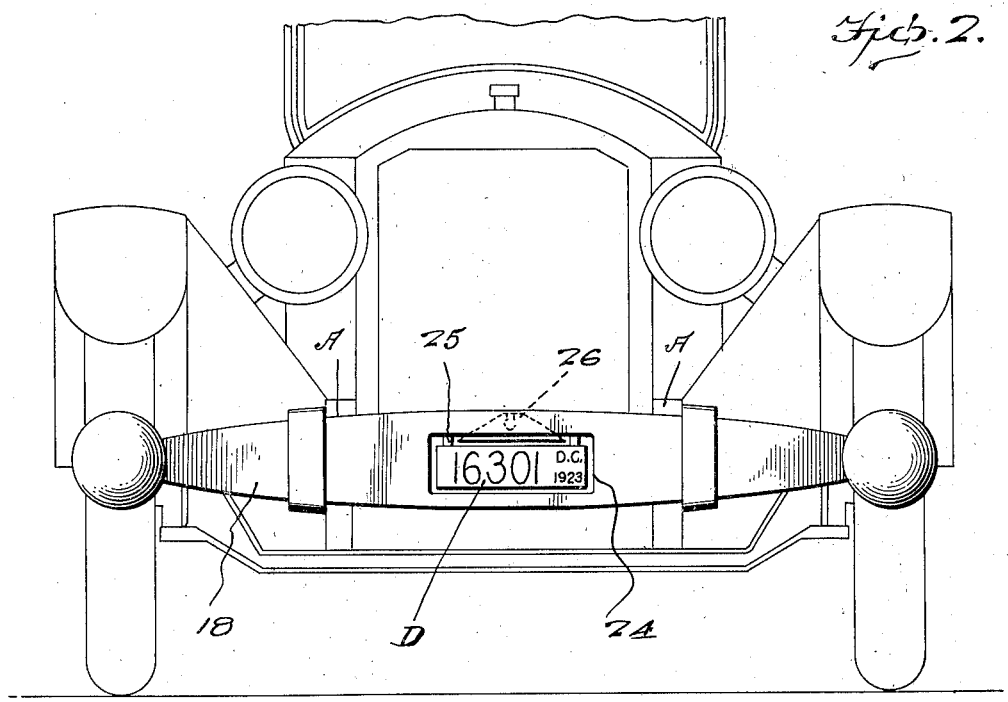
Figure 6:
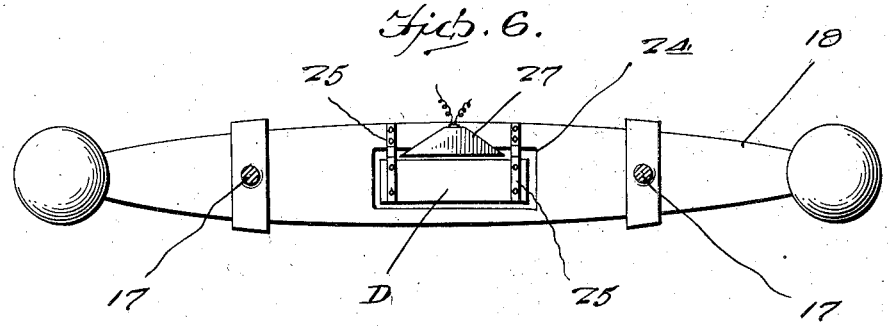
Figure 7:
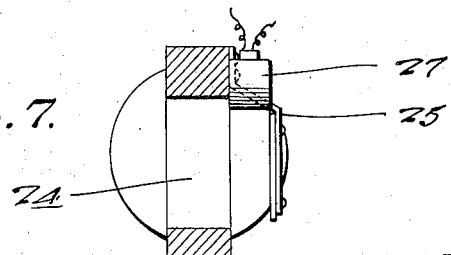

With the above and other objects and advantages in view the invention consists in the details of construction to be hereinafter more fully described and claimed and illustrated in the accompanying drawings, in which:

Figure 1 is a plan view of an automobile chassis showing my device applied thereto, Figure 2 is a front elevation, Figure 3 is a longitudinal section, Figure 4 is a cross section taken through the rock shaft, Figure 5 is a detail perspective view of one of the pedal actuating members, Figure 6 is a rear elevation of the bumper, Figure 7 is a detail sectional view therethrough showing the license plate holding means, Figure 8 is a diagram of the electrical connections to the license plate illuminating means.

Referring more particularly to the drawings the letter A designates the frame of a motor vehicle and B and C represent the clutch and brake pedals. In carrying out my invention I provide a transverse shaft 10 suitably journaled transversely of the frame A in any suitable bearings and carrying, at its ends ratchets 11. Formed on or secured upon this shaft are upwardly and downwardly extending arms designated by the numerals 12 and 13 respectively. Pivotally connected with the free ends of the arms 12 are forwardly extending rods 14 which terminate in forks 15 which engage the shanks of the clutch and brake pedals. Each pedal is provided with a transverse pin 15$^a$ located above the fork engaged thereon for the purpose of preventing the fork from sliding along the pedal.

Mounted upon the forward end of the frame, at opposite sides thereof, are guides 16 which slidably support plungers 17 carrying a bumper 18 which is located in advance of the vehicle and which extends laterally in front of the wheels. The rear ends of the plungers 17 are pivotally connected at 19 with the lower arms 13 carried by the shaft 10.

In the operation it will be seen that in the event of any collision of any kind, engagement of the bumper with the object struck will cause rearward movement of the plungers 17 and locking of the shaft 10 which will cause the forked arms 14 to press the clutch and brake pedals forwardly, resulting in disengagement of the clutch and application of the brakes, without any effort on the part of the operator, the action being entirely automatic. It is to be observed that the forks 15 permit operation of the pedals in the usual manner.

In order that the brakes will be locked immediately when actuated by the bumper, I provide pawls 20 which are pivotally mounted and which may be either of the gravity or the spring pressed type, these pawls co-operating with the ratchets 11 for preventing retrograde movement of the shaft 10 after it has been rocked. To effect release of the brakes after they have been automatically applied, I provide rods 21 pivotally connected with the pawls and extending up through slots 22 in the floor or floor boards with the upper ends terminating in finger loops or the like 23.

A very important feature of the bumper construction is the provision of a relatively large opening 24 therein, behind which is mounted the license plate D held by suitable clips or brackets 25 and illuminated by an incandescent bulb 26 located within a suitable socket 27 supported on the rear of the bumper and electrically connected with one of the head lamps or otherwise connected in the lighting circuit of the car.

From the foregoing description and a study of the drawings it will be apparent that I have thus provided a simply constructed and consequently inexpensive combined bumper structure, license plate holder and brake actuator which will be highly advantageous in use and which will be a great safe guard in motoring. As the parts are few it is apparent that there is little to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

I claim:

1. Means for automatically releasing the clutch and applying the brake of a motor vehicle upon the occurrence of a collision, comprising a pair of elongated guide members secured upon the side bars of the chassis of a motor vehicle, rearwardly extending plunger rods slidable through said guides, a bumper carried by the forward ends of said plunger rods, a shaft journaled transversely of the vehicle chassis rearwardly of the brake and clutch pedals, downwardly extending arms on said rock shaft pivotally connected with the rear ends of said plunger rods, upwardly extending arms on said rock shaft, and forwardly extending rods pivotally connected with said last named arms and having their forward ends abuttingly engaging the clutch and brake pedals.

2. Means for automatically releasing the clutch and applying the brake of a motor vehicle upon the occurrence of a collision, comprising a pair of elongated guide members secured upon the side bars of the chassis of a motor vehicle, rearwardly extending plunger rods slidable through said guides, a bumper carried by the forward ends of said plunger rods, a shaft journaled transversely of the vehicle chassis rearwardly of the clutch and brake pedals, downwardly extending arms on said rock shaft pivotally connected with the rear ends of said plunger rods, upwardly extending arms on said rock shaft, and forwardly extending rods pivotally connected with said last named arms and having their forward ends abuttingly engaging the clutch and brake pedals, the forward ends of said last named rods being forked, and the clutch and brake pedals having transverse pins located above the fork for preventing sliding thereof along the shanks of the pedals.

In testimony whereof I affix my signature.

ELVES W. NORMAN.